United States Patent [19]
Bloore et al.

[11] Patent Number: 4,565,455
[45] Date of Patent: Jan. 21, 1986

[54] HEAT REGULATING SENSOR TAPE

[75] Inventors: Frederick W. Bloore, Wightwick; Peter H. Seaman, Tettanhall, both of United Kingdom

[73] Assignee: Hotfoil Limited, Wombourne, England

[21] Appl. No.: 573,008

[22] Filed: Jan. 23, 1984

[30] Foreign Application Priority Data

Jan. 21, 1983 [GB] United Kingdom ............. 8301666

[51] Int. Cl.⁴ ................................................. H05B 1/02
[52] U.S. Cl. ................................... 374/164; 219/482; 219/504; 338/25
[58] Field of Search .............. 374/183, 185, 164; 219/553, 504, 484; 200/61.04, 61.05; 174/11 R

[56] References Cited

U.S. PATENT DOCUMENTS

| | | | |
|---|---|---|---|
| 2,360,434 | 10/1944 | Manning | 324/65 P X |
| 3,200,388 | 8/1965 | Uhlig | 200/61.04 X |
| 3,668,373 | 6/1972 | Laing | 374/183 |
| 3,705,289 | 12/1972 | Szostak et al. | 219/482 X |
| 3,947,656 | 3/1976 | Lodi | 219/482 X |
| 4,177,376 | 12/1979 | Horsma et al. | 219/505 X |
| 4,246,468 | 1/1981 | Horsma | 219/505 |
| 4,288,654 | 9/1981 | Blom et al. | 174/11 R |
| 4,315,141 | 2/1982 | Mills et al. | 219/505 |
| 4,348,584 | 9/1982 | Gale et al. | 219/553 X |
| 4,496,930 | 1/1985 | Kreicz et al. | 338/214 |

*Primary Examiner*—Daniel M. Yasich
*Attorney, Agent, or Firm*—Shlesinger, Arkwright, Garvey & Fado

[57] ABSTRACT

A temperature sensor in a heating tape includes first and second electrical conductors, a substance such as salt in electrical contact with each of the conductors, said substance having a significantly different electrical resistivity when the substance is at a temperature below a transition temperature range than when the substance is at a temperature above said transition temperature range.

6 Claims, 7 Drawing Figures

HEAT REGULATING SENSOR TAPE

BACKGROUND OF THE INVENTION

This invention relates to a temperature sensor. The invention is particularly, but not exclusively, pertinent to a thermostatic sensor which is operative to cut off or reduce the heating effect of a heat producing device when the sensor detects a temperature at or above a predetermined temperature, and which may be operative to restore the heating effect of the heat producing device when the sensor detects a temperature below the predetermined temperature.

The invention has been primarily devised for use with an electrical heat producing device such as a heating tape to cut off or reduce the power supply to the heating tape when a temperature at or above the predetermined temperature is sensed, although the sensor may be used in many other applications, for example to restrict the supply of fuel to a heat producing device comprising a fuel burner, when the temperature detected is at or above the predetermined temperature or merely to give warning when the predetermined temperature has been reached.

In a heating tape, a conductor (or conductors) extends along the length of the tape. An electrical current is passed through the conductor and, due to the resistance of the conductor, heating occurs. Such heating tapes have many applications such as in preventing the freezing of chemicals in an exposed pipe or duct, around which such heating tape may be wound, or to maintain the temperature of a chemical as the chemical flows from one location to another along a pipe or duct.

Another use is to heat a chemical, in a container around which the tape is wound, to a specific temperature.

It will be appreciated that many chemicals are temperature unstable, that is, the chemical must be kept at or close to a particular temperature for the chemical to be stable. It is important in many applications, for the heating effect of the heating tape to be carefully controlled. Furthermore, it is important to ensure that the heating tape itself is not raised to a temperature above its design limits, when damage to the heating tape could occur. For example, in common types of heating tape, the or each conductor is encased in a rubber or rubbery material to give the tape flexibility and durability as well as protecting the conductor(s) from any adverse environmental conditions. If the tape overheats, the casing material could deteriorate.

It is current practice to monitor the temperature of the heating tape when in use or the chemical being heated at spaced positions but a compromise has to be made between monitoring the temperature at closely spaced positions when a large number of temperature monitors need to be provided, thereby increasing costs, and monitoring the temperature at more widely spaced positions, thereby minimising costs. Of course the former system of monitoring, i.e. using a large number of monitors is the more desirable, allowing for closer monitoring of the temperature, where costs permit.

It would be preferred for the temperature to be monitored along the entire length of the tape without having to provide a large number of temperature monitors.

SUMMARY OF THE INVENTION

It is therefore an object of the present invention to provide a new or improved temperature sensor which overcomes or reduces the disadvantages associated with present temperature monitoring techniques.

According to one aspect of the invention we provide a temperature sensor comprising first and second electrical conductors, a substance in electrical contact with each of the conductors, said substance having a significantly different electrical resistivity when the substance is at a temperature below a transition temperature range than when the substance is at a temperature above said transition temperature range.

By "significantly different electrical resistivity" we mean more than five times lower or higher and preferably more than 100 times lower or higher.

The difference in electrical resistivity of the substance can be sensed by any known means, e.g. electrically to produce a signal to provide an indication that the substance is at a predetermined temperature within said transition temperature range, or alternatively to produce a control signal to control the heating effect of a heat producing device in dependance upon the temperature of the substance, or for any other purpose.

Where the electrical sensing means can sense a small change in resistance between the conductors, a substance can be selected the resistance of which only changes by a small amount within said range.

Where the electrical sensing means can only detect larger changes in resistivity, a substance having a more marked change in resistivity within said transition temperature range would need to be selected.

Where the change in resistivity of the substance over the transition temperature range is such that the resistivity decreases as the temperature rises, then, when the substance is above the transition temperature range, the previously existing high resistance between the conductors is reduced and the electrical current which passes through the substance significantly increases. Where the conductors are elongate, such passage of current may only occur over a limited region or "hot spot" of the conductors which overheat.

The conductors may be connected to a control circuit which is operable to sense said change in resistivity between the two conductors and to provide a control signal to a controllable heat producing device in response to the change in resistivity and hence in response to the temperature of the substance.

Preferably, a resistance, i.e. a resistor, is connected in series between the control circuit and a conductor to limit the current flowing from one conductor to the other to avoid the risk of decomposing said substance. The resistor may have a numerical value in ohms between eight and fifteen times the working voltage in volts e.g. if the working voltage is 240 V, then the resistance preferably has a value between 1920 ohms and 3600 ohms.

Preferably, in use, one of the conductors carries a control voltage, and the other conductor may be connected to earth, via an earth current leakage circuit breaker arranged to provide said indicating or control signal when a current passing to earth from said other conductor is detected.

The heat producing device, where provided, may be an electrical heating means, and the signal from the circuit breaker may be arranged to control the power supply to the heating means.

Alternatively, the heat producing device may be non-electrically powered, and the signal from the circuit breaker may be arranged to control a fuel supply to the heating means.

The substance may be impregnated in or provided on an electrically non-conductive material, such as a woven glass fibrous material, by which at least one of the conductors is surrounded.

Alternatively, at least one of the conductors may have an electrically non-conducting thread, such as a glass fibre thread, wound therearound, for example helically, the spaces between the windings having substance therein. The other conductor may be wound around said one conductor with the thread serving as a spacer and the substance being in electrical contact with both said conductors.

Thus the thread provides an insulating barrier between the conductors, at least below the transition temperature range.

A further thread may be wound around the assembly to bind the conductors together and the assembly may be embedded in a further substance or a different substance.

Further alternatively, first and second conductors may extend in parallel spaced relationship with the electrically non-conducting thread, such as a glass fibre thread, the substance being provided on or in the non-conductive thread to provide a current path between the conductors at least when the substance is more electrically conductive.

The first and second conductors may comprise elongate elements which extend from one location to another as in a heating tape.

Where the conductors are elongate conductive elements, they may be flat and comprise foil elements, or may be round or oval or any other desired cross section.

For example, the conductors may comprise solid or multi-strand core wires, or braided wires.

In one embodiment, the first and second conductors are parallel to one another or at least equally constantly spaced so that the resistance between the conductors, at a given temperature, is constant over the entire length or area of the conductors.

Where the temperature of a large area is to be controlled/monitored, the conductors may be arranged in a lattice over the area but preferably in this case, the conductors comprise lamini conductive elements which extend over substantially the entire area with said substance therebetween.

The upper and lower temperatures of the transition temperature range will vary depending upon the substance. The extent of the transition temperature range, i.e. the difference between the upper and lower temperatures, will also vary depending upon the substance. In the majority of suitable substances the change in resistivity will take place in a transition temperature range of limited extent. The range may be within 20° C. For other substances, the change in resistivity may occur over a temperature range of zero or nearly zero. In this specification, the term "temperature range" is intended to cover a case where the extent of the range is zero, i.e. where the upper and lower temperatures of the range are identical, as well as ranges up to a difference between the upper and lower temperatures of 30° C.

In a preferred embodiment, the substance undergoes a change of state between the limits of the transition temperature range. For example the substance may be solid at a temperature below the transition temperature range, and be molten when at a temperature above the transition temperature range.

In a case where the resistivity changes at, or substantially at, a specific temperature, then the sensing means may be arranged to provide a signal in response to a predetermined temperature being sensed.

In the case of a substance where the resistivity changes over a large transition temperature range, the sensing means may be arranged to provide a signal which varies in response to a change in temperature within the range. For example, on a rising temperature the signal may be provided at the lower end of the range, at some predetermined temperature within the range or at the upper end of the range, depending, of course, on the sensitivity of the sensing means.

The substance is preferably a salt or a mixture of salts. It will be appreciated that in a salt, which is ionic, the positive and negative ions, when the salt is in a solid state, are held in a molecular lattice and thus are not free to move. Hence the salt behaves as an insulator. However, when the salt is in a molten state, the ions are free to move and the salt behaves as a conductor.

Of course, when the salt is in a solid state, there may be a small amount of conduction i.e. current leakage due to any residual free ions within the salt, but such conduction is minimal in comparison with the conduction of the salt when in a molten state and the sensing means can be arranged not to respond to such small current leakage.

However the conduction may increase significantly as the salt temperature approaches the melting point or temperature range where melting occurs over a range of temperatures.

The substance may comprise a single type of salt where, for example the salt melts in the required transition temperature range.

Alternatively, the substance may comprise a mixture of salts or other compounds to achieve melting in a desired transition temperature range.

Salts have been found to be particularly suitable for this use because they give a sharp increase in conductivity over the transition temperature range, although other suitable substances may be used.

The salt or salts may comprise a group 1 salt or salts such as one of, or a mixture of more than one of the following namely:
Potassium Nitrite
Potassium Nitrate
Potassium Bisulphate
Sodium Chlorate
Sodium Nitrite
Sodium Nitrate
Potassium Dichromate
Lithium Nitrate.
Alternatively, or in addition, other salts such as:
Silver Nitrate
Ammonium Nitrate
Ammonium Thiocyanate
may be used.

The electrically non-conductive material and conductors, may be dipped into a salt solution such as a 15% solution of the desired salt or salts, and then the material permitted to dry so that the salt ions remain impregnated in and on the conductors/material whilst the water evaporates.

Alternatively, where one or both of the conductors are sheathed in woven material, the substance may comprise a powder impregnated on the woven material, or the substance may be impregnated by melting the substance and dipping the material into the molten salt.

It will be appreciated that the type of salt or other substance used, the distance between the conductors and the strength of the solution may be chosen empirically to provide a suitable sensor for a particular use. Further, where a control voltage is passed through one of the conductors, the magnitude of the voltage may affect the performance of the sensor. For example, where a high voltage is passed through the conductor, current leakage through the substance below the predetermined transition temperature range may increase. Thus the control voltage needs to be selected with regard to the other factors mentioned, to achieve a suitable sensor.

An advantage of a sensor in accordance with the invention is that the control voltage may comprise a mains voltage, whereby it is unnecessary to provide any expensive transformer or the like to achieve a lower voltage for sensing purposes. The current may be direct or alternating but particularly where mains voltage is used, it is of course more convenient to use an alternating current.

The invention is particularly applicable as a thermostatic sensor to control the heating effect of a heating tape or sheet by providing the sensor in association with the heating tape or sheet which may comprise an outer covering containing one or more elongate heating conductors, such as foils or wires through which, in use, as an electrical current is passed, the conductors having a sufficiently high resistance that heating of the conductors occurs, to sense the temperature of the heating tape or sheet or article heated thereby. The conductors may be embedded in a non-conductive material such as fibreglass and/or covered by a rubber material.

The thermostatic sensor may also be contained within the outer covering.

The conductors of the sensor may comprise also two heating conductors of the heating tape or sheet.

BRIEF DESCRIPTION OF THE DRAWINGS

The invention will now be described with the aid of the accompanying drawings in which.

DESCRIPTION OF THE PREFERRED EMBODIMENTS

Figure 1:
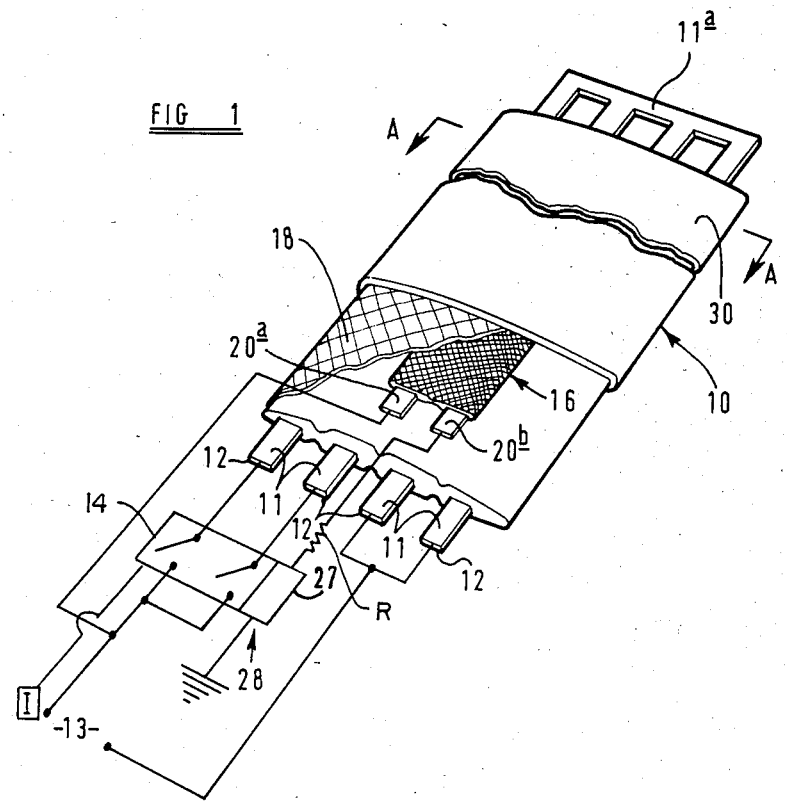
FIG. 1 is a fragmentary perspective view partly broken away showing a heating tape having a first embodiment of a temperature sensor in accordance with the invention, and diagrammatically, electrical connections to the heating tape and sensor.
Figure 2:
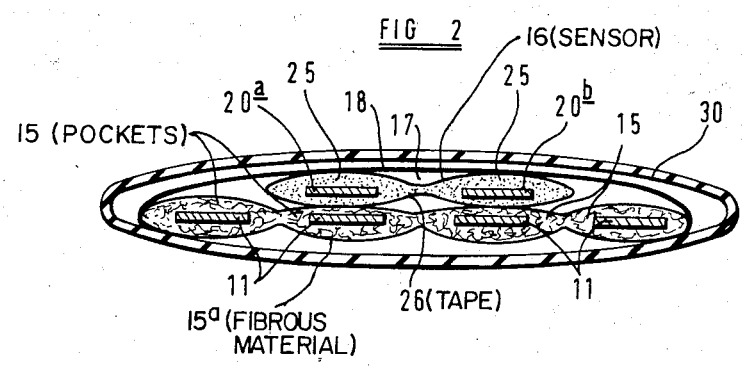
FIG. 2 is an end cross section on the lines A—A of FIG. 1.
Figure 3:
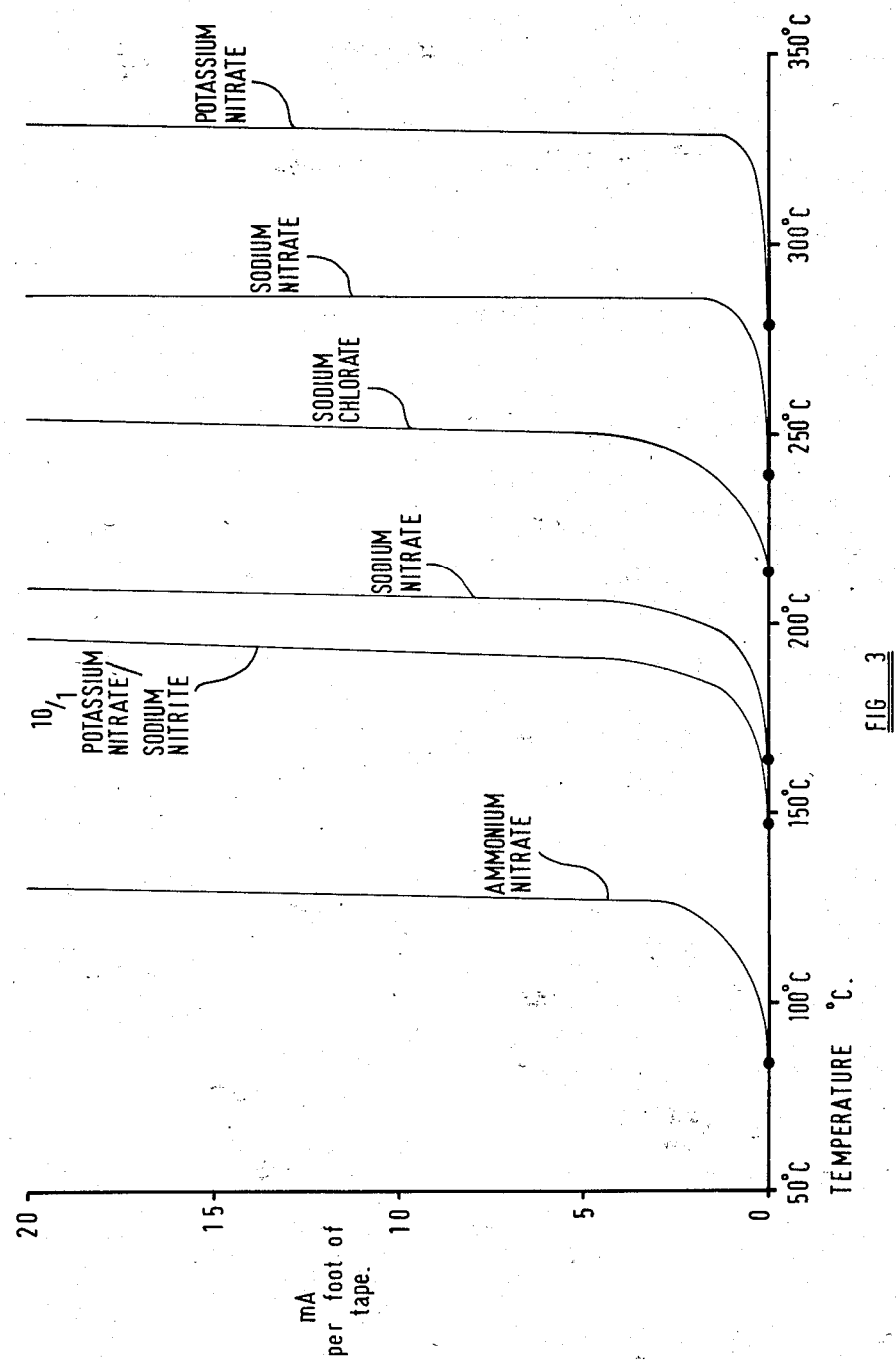
FIG. 3 is a graph plotting current passing through a substance against the temperature of the substance for various substances which may be used in the sensor of FIGS. 1 and 2.

Referring to FIGS. 1 to 3 of the drawings, a heating tape 10 comprises four elongate conductors 11 arranged in two pairs which are adapted to carry an electrical current and are connected as illustrated diagrammatically, at one end 12, to a power source 13, one pair being connected through a relay 14, or solid state switch, the other ends of the conductors 11 being mutually interconnected by a further conductor 11a, so that the current flows from one of the conductors 11 of each pair to the other.

The conductors 11 are thin and provide a high resistance to the flowing current, thus causing heating of the conductors 11 and hence of the heating tape 10.

The conductors 11 are arranged in individual pockets 15 of a non-conductive, woven, glass fibrous material 15a which extends longitudinally of the tape and maintains the spacing between the conductors, without any risk of short circuit, whilst permitting flexibility of the tape.

A further pocket 17 bounded by one side of the material 15a, and a further flap 18 of non-conductive glass fibrous woven material, is also provided along the length of the heating tape 10, in which pocket 17 a temperature sensor 16 according to the invention is received.

As shown in FIG. 2, flap 18 only partially encircles glass fibrous material 15a, however, flap 18 could be extended beneath material 15a to fully enclose the same.

The temperature sensor 16 comprises a pair of conductors 20a and 20b also received in individual pockets 25 of a further inner tape 26 of the sensor 16, which inner tape 26 is again made from a woven glass fiber material but could be made from an alternative material.

However, inner tape 26 is not entirely insulated, in that the inner tape 26 is impregnated with a substance, preferably as hereinafter described, which is solid and non-conducting or substantially non-conducting below a transition temperature range, and molten and conducting at a temperature above the transition temperature range. As best shown in FIG. 2, "26" designates a salt impregnated woven glass fiber inner tape whereby inner tape 26 is heated due to its proximity to heat generating conductors 11.

Thus there is a current path between the two conductors 20a, 20b when the temperature of the substance is at or above a predetermined temperature within said transition temperature range which may be the melting point of the substance, or a temperature near to the melting point depending on the nature of the substance, and thus the temperature sensor 16 can be used to control the heating effect of the heating tape 10 as follows.

One of the conductors 20b is grounded, via a resistor R in series with a current detector 27 which, when a current is detected in conductor 20b provides a control signal to the relay 14 to switch off the power supply to the conductors 11. The other conductor 20a is connected to the power supply 13 or alternatively to a lower power source as required. The current detector 27 and relay 14 together comprise a circuit breaker 28. The resistor R limits the current to the circuit breaker 28 and has a numerical value in ohms of between eight and fifteen times the working voltage in volts.

Many other methods of using the varying conductivity between conductors 20a and 20b to control the power supply to conductors 11 can be used. For example an electronic circuit could be provided to sense the change in resistance between the conductors 20a, and 20b, the circuit also being operative when the resistivity significantly decreases, as the substance melts, to provide a control signal to cut-off the power supply to conductors 11.

If desired, in addition or instead of controlling the current supply to the conductors 11, an indicating means such as that shown at "1", may be provided to indicate that a temperature above a predetermined temperature within the transtion temperature range, has been attained.

As stated above, the woven glass fibre material forming inner tape 26 is impregnated with a substance. Preferred substances are salts whereby impregnation may be accomplished by preparing a solution of the salt, for example a 15% solution, and dipping the tape 26, with the conductors 20a, 20b embedded therein, in the woven glass fiber material of inner solution and then permitting the material to dry. Alternatively, the woven glass fiber material of inner tape 26 could be dipped in molten substance or powder could be impregnated into the material.

Preferably a salt is chosen which has a significant decrease in resistivity in a selected transition temperature range.

Referring particularly to FIG. 3, a graph is shown which plots the current flowing through, against the temperature of, various substances, all of which are salts, and most of which are group 1 salts.

For example, below a transition temperature range, the lower limit of which is about 210° C., there is very little current permitted to flow through the sodium chlorate, indicating a high resistivity. Above the upper limit of the transition temperature range, i.e. about 250° C., current is permitted to flow freely.

The current detector 27 is arranged to detect only a current above the small current which can flow when the substance is below the lower limit of the transition temperature range.

Depending upon the sensitivity of the current detector 27, it may detect a decrease in resistivity which occurs at the lower end of the transition range, or at any temperature within the range.

The melting point of sodium chlorate is 255° C. It can be seen from FIG. 3 that due to the current flowing in conductors 20a, 20b that the salt conducts below this melting temperature. Generally, the higher the control voltage, the lower the temperature at which the salt conducts. This is also dependant on the distance between the conductors 20a and 20b and the amount of substance, i.e. the density of substance between the conductors.

Thus the graphs are only intended to show the characteristic increase of current flow over a transition temperature range which is near the melting point. Although the graph only shows currents up to 20 mA, it will be appreciated that much higher currents can flow. Other salts of course have different melting points and may alternatively be used where the melting point is close to the predetermined temperature within the transition temperature range, which it is designed to detect.

For the other examples shown in the graph, the melting points are given in Table 1 below.

TABLE 1

| Substance | Melting Point °C. |
|---|---|
| Ammonium Nitrate | 170 |
| 10/1 Mixture Potassium Nitrate/Sodium Nitrite | 192 |
| Sodium Nitrate | 310 |
| Sodium Chlorate | 255 |
| Sodium Nitrate | 271 |
| Potassium Nitrate | 338 |

Other substances which may be used are given in Table 2, with their melting points indicated.

TABLE 2

| Substance | Melting Point °C. |
|---|---|
| Potassium Nitrate | 440 |
| Potassium Bisulphate | 219 |
| Silver Nitrate | 210 |
| Potassium Dichromate | 398 |
| Ammonium Thiocyanate | 146 |
| Lithium Nitrate | 250 |

Of course other substances which exhibit a significant fall in resistivity over a transition temperature range could alternatively be used. It is also possible, in principle, to use a substance which exhibits a rise in resistivity over the temperature range.

Referring again to FIGS. 1 and 2, the conductors 11, woven glass fiber insulating material 15a and the thermostatic sensor 16, are all encased in a rubber, plastic or other suitable non-conductive protective casing 30 which again permits flexing of the tapes 10 and 26 whilst providing protection against adverse environmental conditions.

It will be appreciated that it is important that the impregnated material of the temperature sensor 16 should not become wet because this would result in an immediate short circuit between the conductors 20a and 20b irrespective of the temperature attained by the tape.

Although in the example described, the conductors 20a, 20b and 11 are each received in individual pockets in a woven glass fibre material, it will be appreciated that any other suitable non-conductive material, or material which can be impregnated with substance, could be used.

The invention is not limited to heating tapes as described. For example, a temperature sensor such as sensor 16 may be used to control the temperature of a heating plate, in which case the conductors 20a and 20b and the substance impregnated in the tape 26 may be arranged in a lattice over the entire hot plate. Alternatively, instead of the conductors being elongate conductive elements as shown, the conductors may themselves comprise lamini elements between which the substance is located.

Furthermore, the invention is not only applicable to electrical heating means, but a control signal could be derived from a temperature sensor such as sensor 16 and used to cut off or reduce the supply of fuel to a fuel burner or any other heat producing device.

Thus the sensor 16 has wider application as a thermostatic sensor not only to control the heating effect of any heating means, but also to provide a temperature dependant signal for any purpose.

Although a temperature sensor 16 has been described, it will be appreciated that such a sensor 16 may be used to merely detect a temperature at above or below a predetermined temperature. The sensor may be connected in a control circuit, or in a circuit including a circuit breaker as described above to merely give an indication or warning such as an alarm or visual indication that a predetermined temperature within the transition temperature range has been reached, or exceeded or fallen below.

It will be appreciated that as an alternative to providing a separate sensor 16 by arranging for the glass fibre woven material surrounding the conductors 11 to be impregnated with substance, and providing a suitable control circuit to detect the change in resistivity between conductors 11, that the heating conductors 11 could themselves be used as the conductors of a thermostatic sensor.

If desired, where the substance is sufficiently mechanically strong, the substance need not be impregnated in or on a woven material as described, but could be a powder or solid surrounding the conductors, such as described below with reference to FIG. 4.

In the example shown in FIGS. 1 to 3, it has been found that it is necessary to use a 110 or 240 mains voltage as a control voltage to achieve a sharp enough decrease in resistivity at the predetermined temperature.

In another construction a control voltage as low as 50 volts (or lower) may be used.

It is important in the sensor described with reference to FIGS. 1 to 3 of the drawings that an even as possible deposit of substance is provided in and on the material forming the inner tape 26 and for the conductors 20a, 20b to be equi-distant apart, e.g. approximately 2 mm to 3 mm apart along their entire length.

Figure 4:
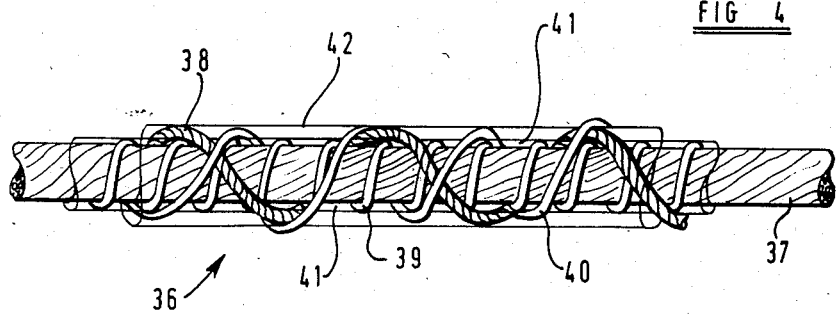
FIG. 4 is a schematic diagram, partly in section, of a second embodiment of a temperature sensor in accordance with the invention.

Referring now to FIG. 4, there is shown a second embodiment of the invention comprising a temperature sensor 36. The sensor 36 is not shown incorporated into a heating tape 10 as hereinbefore described, but may if required be used in place of sensor 16, or in any other type of heating tape, or in any other application where it is desired to monitor a temperature and/or control a heating means.

The sensor 36 has a pair of conductors 37, 38 corresponding to conductors 20a, 20b of the embodiment shown in FIGS. 1 and 2, in the present case the conductor 38 being thinner than the conductor 37, although they could be of the same size, and the conductor 38 is spirally wound around the conductor 37 but they are spaced from one another as hereinafter described.

In the example shown, the conductors 37, 38 each comprise a multistrand wire for flexibility, so that the sensor 36 can be wrapped around a pipe for example, if required, although alternatively one or both of the conductors could be solid, or even braided.

Helically wound around conductor 37 is a glass fiber thread 39. In the spaces between the windings of thread 39 are deposits 41 of substance, such as a salt as discussed above in connection with the FIGS. 1 and 2 embodiment. The substance may be deposited by dipping the conductor 37 and thread 39 into a solution of the substance and then permitting the water of the solution to evaporate off, or may be otherwise impregnated.

The deposits 41 are only shown in outline and not in section, for clarity of the drawing.

The second conductor 38 is bound to the conductor 37 and thread 39 assembly by a further glass fibre thread 40, the spacing between conductors 37 and 38 being maintained constant over the length of the sensor 36 by the thread 39. The whole assembly of conductors 37, 38 and threads 39 and 40 is then dipped into the solution of substance and dried as before, to leave a further deposit 42 of substance surrounding the conductors and threads. Again only the outline of deposits 42 is shown.

The conductor 37 remains insulated from conductor 38 by virtue of thread 39 and the deposits of substance, at least when the substance is below the lower limit of the transition temperature range.

Again, where the substance is a salt, at or above the lower limit of this temperature range, the substance is substantially more conducting. The lower limit, or a temperature within the range may be the same as the melting point of the salt. Of course, any other substance may be used as described in connection with the embodiment of FIGS. 1 and 2.

The conductors 37 and 38 may be connected to a control circuit, similar to that described with reference to FIGS. 1 and 2, or any other control circuit as required to sense the decrease in restisivity of the substance and to provide an indication or warning signal when a temperature within the transition temperature range is sensed.

The thread 39 need not be helically wound about the conductor 37 as described, but alternatively a sheath of glass fibre impregnated with a salt or other substance could be used.

It will be appreciated that the sensor 36 can extend along the entire length of the heating tape such as that shown at 10 in FIGS. 1 and 2, or could extend over only a short distance, to detect a temperature in a localised area.

In place of glass fibre thread or sheathing, any other non-conducting material which can maintain the spacing between conductors 37 and 38 and retain deposits of substance, could be used.

Of course, it is not essential to use the same substance for deposits 41 and 42, but a different substance for each could be used.

Figure 5:
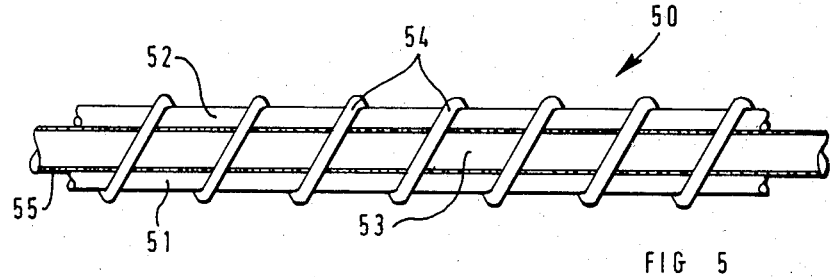
FIG. 5 is schematic diagram, partly in section, of a third embodiment of temperature sensor in accordance with the invention.

Referring now to FIG. 5, there is shown a third embodiment of the invention comprising a temperature sensor 50 which may be used in a similar manner to the sensor 36. In this embodiment, the sensor has a pair of parallel conductors 51, 52 each comprising a multistrand wire for flexibility and maintained in spaced parallel relationship by glassfibre or other non-inflammable, non-electrically conductive threads 53 disposed between the conductors. The conductors 51, 52 and threads 53 are secured together by a helically wound thread 54, again of glass fiber or other suitable material as discussed with reference to the FIG. 4 embodiment. The whole assembly of conductors 51, 52 and threads 53 and 54 are dipped into a solution of a substance as described in connection with the previous embodiments to leave a deposit 55 surrounding the central thread. This deposit provides a current path between the conductors when the temperature makes the substance conductive.

Figure 6:
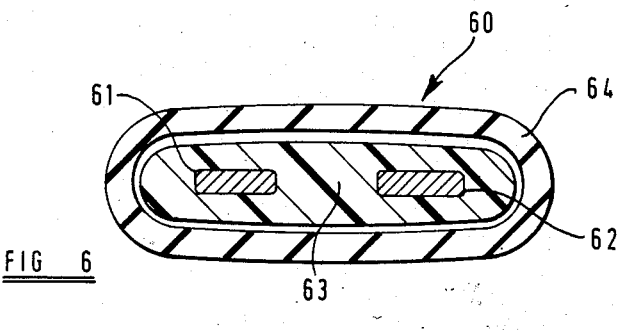
FIG. 6 is a schematic sectional diagram of a fourth embodiment of the invention.

In a further embodiment, shown in FIG. 6, a heating tape 60 comprises a pair of spaced parallel elongate electrical conductors 61, 62 of high resistance so as to act as heating conductors in conventional manner. The conductors 61, 62 are surrounded by a non-conductive woven glassfibre material 63 which extends longitudinally of the tape and maintains the spacing between the conductors. The tape is provided with a conventional outer protective covering 64. The glassfibre material 63 is impregnated with a substance as described hereinbefore so as to be solid and non-conducting or substantially non-conducting below a predetermined transition temperature range and melting and conducting at a temperature above the predetermined transition temperature range. Suitable electrical circuitry would need to be provided to sense a short circuit when the resistivity of the substance decreases.

Figure 7:
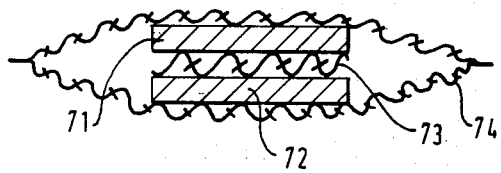
FIG. 7 is a schematic view of a fifth embodiment of the invention.

FIG. 7 shows yet another embodiment in which a temperature sensor comprising a pair of elongate foil conductors 71, 72, each of which are ⅛ inch (3.17 mm) wide and 0.002 inch (0.06 mm) thick. The foils 71, 72 are separated by a woven glass fiber cloth 73 which is impregnated with substance as described with reference to the other embodiments described above. The assembly is sewn into a glass fiber tube 74 and/or if required placed in a protective rubber or other outer casing. This sensor could be used instead of the sensor 16 of the FIGS. 1 and 2 embodiments.

The constructions described above are particularly useful because they are suitable for using mains voltage as a control voltage, thus eliminating the need to provide any transformer or the like to reduce the mains voltage.

We claim:

1. In a heat regulating system including power supply means and power supply regulating means connected to said power supply means, the improvement comprising:
   (a) a flexible, elongated heating tape including a flexible elongated, non-conductive outer sleeve,
   (b) a flexible, elongated resistive heating element positioned within said outer sleeve, said heating element being generally coextensive with said outer sleeve and adapted to be connected to said power supply means via said power supply regulating means,
   (c) a pair of spaced-apart, flexible, elongated electrical conductors positioned within said outer sleeve and being generally coextensive therewith, one of said conductors being adapted for connection to said power supply means and the other of said conductors being adapted for connection to said power supply regulating means,
   (d) spacer means for maintaining said electrical conductors in spaced relation with respect to one another and with respect to said heating element,
   (e) a substance in said outer sleeve in electrical contact with each of said conductors and spaced from said heating element by said spacer means, said substance having a significantly different electrical resistivity when said substance is at a temperature below a transition temperature range than when said substance is at a temperature above said transition temperature range,
   (f) said pair of electrical conductors, said spacer means and said substance together forming a temperature sensor for activating said power supply regulating means, whereby when said heating element is connected to said power supply means via said power supply regulating means and said one of said conductors is connected to said power supply means and said other of said conductors is connected to said power supply regulating means, said power supply regulating means is activated by said temperature sensor to disrupt current flow from said power supply means to said heating element in response to a decrease in the resistance of said substance as said substance is heated to a temperature corresponding to said transition temperature range and said power supply regulating means is deactivated by said temperature sensor to allow current flow to said heating element in response to an increase in the resistance of said substance when the temperature of said substance subsides below said transition temperature range.

2. A heat regulating system as in claim 1, wherein:
   (a) said spacer means including a first woven glass fiber material impregnated with said substance and surrounding said electrical conductors and a second woven glass fiber material surrounding said heating element.

3. A heat regulating system as in claim 1, wherein:
   (a) said electrical conductors being arranged parallel to one another.

4. A heat regulating system as in claim 1, wherein:
   (a) said conductors comprising first and second conductors formed of multi-strand wire,
   (b) said first conductor being generally straight in configuration,
   (c) said spacer means being positioned around said first conductor, and
   (d) said second conductor being helically wound around said first conductor and spaced therefrom by said spacer means.

5. A heat regulating system as in claim 4, wherein:
   (a) said spacer means comprising a glass fiber thread, and,
   (b) said glass fiber thread being helically wound around said first conductor.

6. A heat regulating system as in claim 1, wherein:
   (a) said substance is a salt or a mixture of salts selected from the group comprising potassium nitrite, potassium nitrate, potassium bisulphate, sodium chlorate, sodium nitrite, sodium nitrate, potassium dichromate, lithium nitrate, silver nitrate, ammonium nitrate and ammonium thiocyanate.

* * * * *